United States Patent
Georgieva et al.

(10) Patent No.: US 9,664,049 B2
(45) Date of Patent: May 30, 2017

(54) BRAZE ALLOY COMPOSITIONS AND BRAZING METHODS FOR SUPERALLOYS

(71) Applicant: Siemens Energy, Inc., Orlando, FL (US)

(72) Inventors: Petya M. Georgieva, Oviedo, FL (US); James A. Yarbrough, Spring, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 433 days.

(21) Appl. No.: 14/070,626

(22) Filed: Nov. 4, 2013

(65) Prior Publication Data
US 2015/0125281 A1    May 7, 2015

(51) Int. Cl.
| | |
|---|---|
| F01D 5/00 | (2006.01) |
| B23K 35/30 | (2006.01) |
| B23K 1/00 | (2006.01) |
| F01D 5/12 | (2006.01) |
| B23P 6/04 | (2006.01) |
| B23K 35/02 | (2006.01) |
| F01D 9/02 | (2006.01) |

(Continued)

(52) U.S. Cl.
CPC ............ *F01D 5/005* (2013.01); *B23K 1/0018* (2013.01); *B23K 35/025* (2013.01); *B23K 35/3033* (2013.01); *B23K 35/3046* (2013.01); *B23P 6/045* (2013.01); *C22C 19/057* (2013.01); *C22C 19/07* (2013.01); *F01D 5/12* (2013.01); *F01D 9/02* (2013.01); *B23K 2201/001* (2013.01); *F05D 2230/237* (2013.01); *F05D 2230/80* (2013.01); *F05D 2300/175* (2013.01); *F05D 2300/177* (2013.01); *Y10T 403/479* (2015.01)

(58) Field of Classification Search
CPC ......... C22C 19/05; B23P 6/045; B23K 31/00; B23K 35/007; F01D 5/005
USPC .......................................................... 420/441
See application file for complete search history.

(56) References Cited

U.S. PATENT DOCUMENTS 6,454,885 B1 * 9/2002 Chesnes ................ B22F 1/0003
148/528
2002/0157737 A1   10/2002 Chesnes et al.
(Continued)

FOREIGN PATENT DOCUMENTS

| EP | 1623787 A1 | 2/2006 |
|---|---|---|
| EP | 1803521 A1 | 7/2007 |
| EP | 2022599 A1 | 11/2009 |

OTHER PUBLICATIONS

Harris K., Erickson G.L., Schwer R.E., Mar M 247 derivations—CM 247 LC DS alloy, CMSX single crystal alloys, properties and performance, in: Gell M. et al. (Eds.), Superalloys 1984, The Metallurgical Society of AIME, Warrendale, PA, USA, 1984, pp. 221-230.*

(Continued)

*Primary Examiner* — Jessee Roe
*Assistant Examiner* — Jeremy Jones

(57) ABSTRACT

A multi-component braze filler alloy comprising at least 70% by weight MarM509A superalloy with the remainder MarM509B superalloy is diffusion brazed to a CM247 alloy base substrate, such as a gas turbine blade or vane. It is shown that generally higher braze temperatures lead to improved results including the possibility of re-welding such a brazed component, resulting in a re-repaired brazed component capable of continued commercial service.

9 Claims, 13 Drawing Sheets

--- a) Increase furnace temperature to 1800°F ±25°F at 28°F per minute maximum under partial pressure (vacuum of 5X10⁻⁴ or less acceptable)

b) Decrease the pressure of the furnace pressure to 5X10⁻⁴ or less and hold for stabilization c) Increase furnace temperature to 2270°F ±12°F at a rate no greater than 10°F per minute and hold for 240-255 minutes for braze and diffusion cycle time combined. The furnace pressure of 5X10⁻⁴ or less must be maintained d) Vacuum cool furnace temperature to 1975°F ±25°F in ≤ 3 minutes e) Rapid cool by back purging with argon gas down to room temperature

COMBINED BRAZE & DIFFUSION CYCLE

(51) Int. Cl.
*C22C 19/05* (2006.01)
*C22C 19/07* (2006.01)
*B23K 101/00* (2006.01)

(56) References Cited

U.S. PATENT DOCUMENTS

2004/0050909 A1 3/2004 Renteria et al.
2012/0084980 A1* 4/2012 Miglietti .............. B23K 35/007
29/889.1

OTHER PUBLICATIONS

Miglietti, Warren Martin Andre. "High Strength, Ductile Wide Gap Braze Joints for Stationary Turbine Component Repairs." Thesis. University of Pretoria, 2008. High Strength, Ductile Wide Gap Braze Joints for Stationary Turbine Component Repairs. Web. Sep. 24, 2015.*
Petya M. Georgieva and James A. Yarbrough, "Braze Alloy Compositions and Brazing Methods for Superalloys", Siemens; related US Patent pplication by the same inventors filed on the same day as the patent application associated with this IDS for Sieens.

* cited by examiner

| TEST | BRAZE ALLOY | ALLOY MIXTURE | FURNACE CYCLE |
|---|---|---|---|
| CM247A-04 | MarM509A \ MarM509B | 50/50 Crack Repair Paste | 2050 VAC CLEAN 2200 BRAZE |
| CM247A-05 | MarM509A \ MarM509B | 60/40 Crack Repair Paste | 2050 VAC CLEAN 2200 BRAZE |
| CM247A-06 | MarM509A \ MarM509B | 70/30 Crack Repair Paste | 2050 VAC CLEAN 2200 BRAZE |
| CM247A-07 | MarM509A \ MarM509B | 50/50 Remelt Evaluation | 2200 BRAZE |
| CM247A-08 | MarM509A \ MarM509B | 60/40 Remelt Evaluation | 2200 BRAZE |
| CM247A-09 | MarM509A \ MarM509B | 70/30 Remelt Evaluation | 2200 BRAZE |
| CM247A-10 | MarM509A \ MarM509B | Post Braze Weld Evaluation | 2200 BRAZE |

FIG. 1

VACUUM CLEAN FURNACE CYCLE

A vacuum of $10^{-4}$ torr (minimum) shall be maintained during the entire cleaning cycle a) Ramp up at 20°F/min to 1200°F and hold for 10 minutes b) Ramp up at 30°F/min and hold at 1800°F for 10 minutes c) Ramp up at 30°F/min to 2120°F (±25°F) and hold for three (3) hours d) Gas fan cool at 40°F/min minimum

FIG. 2

Heat @ 17°F/min to 1100°F ± 25°F and hold for 30 minutes
Heat @ 17°F/min to 1600°F ± 25°F and hold for 30 minutes
Heat @ 22°F/min to 1950°F ± 25°F and hold for 30 minutes
Heat @ 22°F/min to 2050°F ± 10°F and hold for 30 minutes
Heat @ 35°F/min to 2200°F ± 10°F and hold for 40 minutes
Cool @ 22°F/min to 2050°F ± 10°F and hold for 240 minutes
Argon Cool @ 40°F/min to 150°F and hold for 30 minutes
COMBINED BRAZE & DIFFUSION CYCLE
FIG. 5
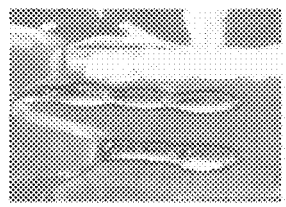 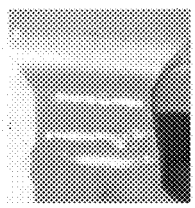 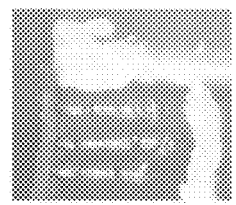
FIG. 6  FIG. 7  FIG. 8
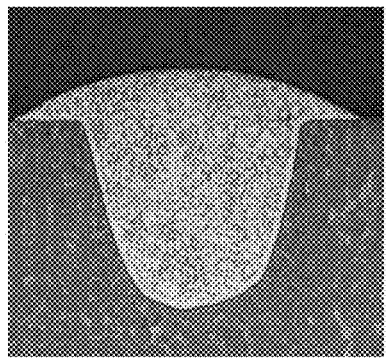 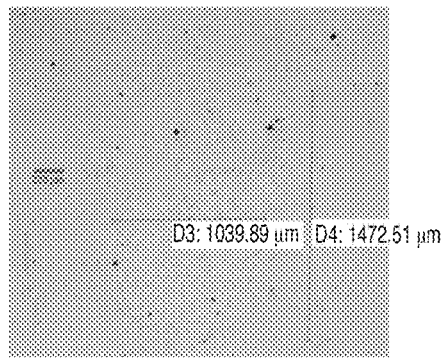
FIG. 9  FIG. 10

| | | | |
|---|---|---|---|
| CM247B-14 | CM247 \ BRB | 60/40 Crack Repair Paste | 2270 BRAZE |
| CM247B-15 | CM247 \ BRB | 70/30 Crack Repair Paste | 2270 BRAZE |
| CM247B-16 | CM247 \ BRB | 80/20 Crack Repair Paste | 2270 BRAZE |
| CM247B-17 | CM247 \ BRB | 60/40 Remelt Evaluation | 2270 BRAZE |
| CM247B-18 | CM247 \ BRB | 70/30 Remelt Evaluation | 2270 BRAZE |
| CM247B-19 | CM247 \ BRB | 80/20 Remelt Evaluation | 2270 BRAZE |
| CM247B-20 | CM247 \ BRB | 60/40 Preform Braze | 2270 BRAZE |
| CM247B-21 | CM247 \ BRB | 75/25 Preform Braze | 2270 BRAZE |
| CM247B-22 | CM247 \ BRB | 80/20 Preform Braze | 2270 BRAZE |
| CM247B-24 | CM247 \ BRB | Post Weld Evaluation | 2270 BRAZE |
| CM247A-29 | MarM509A \ MarM509B | 60/40 Crack Repair Paste | 2270 BRAZE |
| CM247A-30 | MarM509A \ MarM509B | 70/30 Crack Repair Paste | 2270 BRAZE |
| CM247A-31 | MarM509A \ MarM509B | 80/20 Crack Repair Paste | 2270 BRAZE |
| CM247A-32 | MarM509A \ MarM509B | 60/40 Remelt Evaluation | 2270 BRAZE |
| CM247A-33 | MarM509A \ MarM509B | 70/30 Remelt Evaluation | 2270 BRAZE |
| CM247A-34 | MarM509A \ MarM509B | 80/20 Remelt Evaluation | 2270 BRAZE |
| CM247A-35 | MarM509A \ MarM509B | 60/40 Preform Braze (0.100) | 2270 BRAZE |
| CM247A-36 | MarM509A \ MarM509B | 70/30 Preform Braze (0.030) | 2270 BRAZE |
| CM247A-37 | MarM509A \ MarM509B | 80/20 Preform Braze (0.030) | 2270 BRAZE |
| CM247A-39 | MarM509A \ MarM509B | Post Weld Evaluation | 2270 BRAZE |

FIG. 13

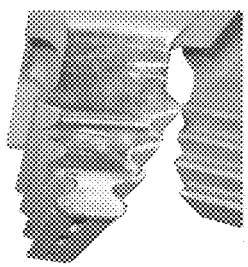
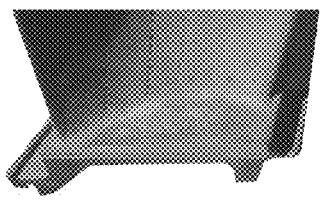
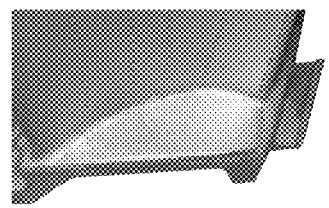

FIG. 14　　　FIG. 15　　　FIG. 16

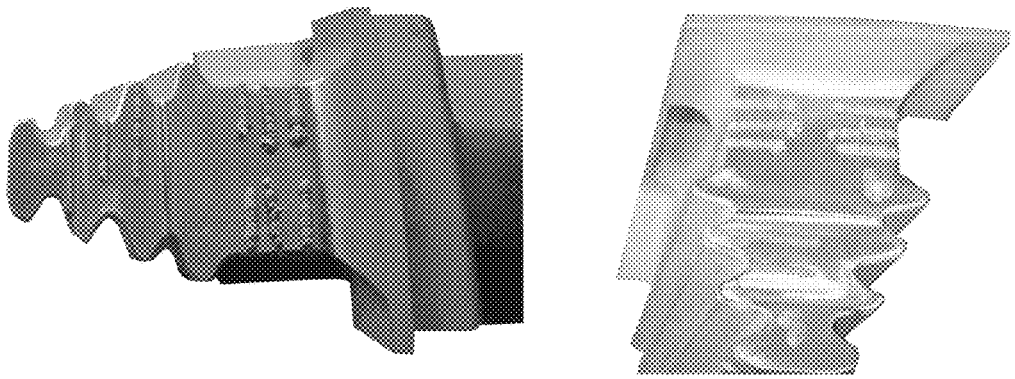

FIG. 17 a) Increase furnace temperature to 1800°F ±25°F at 28°F per minute maximum under partial pressure (vacuum of $5 \times 10^{-4}$ or less acceptable)

b) Decrease the pressure of the furnace pressure to $5 \times 10^{-4}$ or less and hold for stabilization c) Increase furnace temperature to 2270°F ±12°F at a rate no greater than 10°F per minute and hold for 240-255 minutes for braze and diffusion cycle time combined. The furnace pressure of $5 \times 10^{-4}$ or less must be maintained d) Vacuum cool furnace temperature to 1975°F ±25°F in ≤ 3 minutes e) Rapid cool by back purging with argon gas down to room temperature

COMBINED BRAZE & DIFFUSION CYCLE

FIG. 18

Test Temperature (F): 1400

| Metcut Test Start No. | Specimen Identification | Test Material Description | Hardness (HRC) | U.T.S. (ksi) | 0.2%YS (ksi) | Elong. (%) |
|---|---|---|---|---|---|---|
| T-194988 | 45 | Base Material | 39.0 | 126.3 | 94.7 | 12.5 |
| T-194994 | 46 | Weld Using 625 | 7.0 | 68.9 | 36.5 | 6.9 |
| T-195015 | 47 | Braze MarM509A/B 60/40 | 38.5 | 94.8 | a | 0.3 |
| T-195021 | 48 | Braze MarM509A/B 70/30 | 37.5 | 99.9 | 96.7 | 1.1 |
| T-195039 | 49 | Braze CM247/BRB 60/40 | 37.0 | 112.7 | 94.9 | 5.2 |
| T-195054 | 50 | Braze CM247/BRB 70/30 | 36.5 | 117.6 | 99.8 | 3.2 |
| T-195072 | 51 | Braze CM247/BRB 60/40 POST FIC | 37.0 | 108.7 | 98.3 | 1.6 |
| T-195084 | 52 | Braze CM247/BRB 70/30 POST FIC | 36.0 | 111.5 | 95.8 | 4.0 |

Nominal Gage Dimensions: 0.25 in width x 0.102 in thick x 1.38 in eg]
Testing Specification: ASTM E-21(09)
Extensometer Gage Length (in.) 1.0
Strain Rate through 2.0% yield: 0.005 in./in./min.
Head Rate thence to failure: 0.05 in./min.

FIG. 33

BRAZE ALLOY COMPOSITIONS AND BRAZING METHODS FOR SUPERALLOYS

BACKGROUND OF THE INVENTION

1. Field of the Invention

The invention relates to the brazing and repair of superalloy components, and in particular to brazing compositions and methods for brazing superalloy blade and vane components used in gas turbines, with braze compositions and brazing procedures that consistently provide good brazing of test samples, some embodiments of which permit post braze welding without substantial degradation of structural properties.

2. Description of the Prior Art

Structural repair or new fabrication of nickel and cobalt based superalloy materials that are used to manufacture turbine components, such as cast turbine blades, are challenging, due in part to the metallurgic properties of the superalloy material. For example, a superalloy having more than about 6% aggregate aluminum or titanium content, such as nickel-base superalloys with low carbon content e.g., CM247, is typically more susceptible to solidification cracking when subjected to high-temperature welding than a lower aluminum-titanium content superalloy, e.g., X-750. Superalloys used in finished turbine blades are typically strengthened during post casting heat treatments, which render them difficult materials upon which to perform subsequent structural welding repairs. Currently used welding processes for superalloy fabrication or repair generally involve substantial melting of the substrate adjoining the weld preparation, and complete melting of the added welding filler material. When a blade constructed of such a material is welded with filler of the same or similar alloy, e.g., for structural repair, the blade is susceptible to solidification cracking (aka liquation cracking) within and proximate to the weld. Post weld solidification cracked superalloy vanes and blades are generally scrapped as unrepairable, after considerable time and expense was already expended to attempt to repair the blade. Given the shortcomings of superalloy structural repair welding, often the only commercially acceptable solution is to scrap damaged turbine blades that require structural repair, because past experience has shown limited success of such structural repairs. Thus repairs have been limited to those particular materials, components and types of structural damage that have in the past been proven amenable to successful repair by cosmetic welding, employing more ductile welding filler materials with reduced structural strength. Blades needing welded structural repairs with a known relatively high risk of post weld solidification cracking are generally scrapped. Providing brazing compositions and methods that can withstand post braze welding without significant solidification cracking or other degradation of structural, mechanical or other properties would permit repair and reuse of such components, an important economic benefit.

Non-structural repair or fabrication of metal components, including superalloy components, typically involves replacing damaged material (or joining two components of newly fabricated material) with mismatched alloy material of lesser structural properties, where the superior structural performance of the original substrate material is not needed in the localized region. For example, such non-structural or "cosmetic" repair may be used in order to restore the repaired component's original profile geometry. For the repair of gas turbine components, an example of cosmetic repair is the filling of surface pits, cracks or other voids on a turbine blade airfoil in order to restore its original aerodynamic profile, for cases in which the mechanical properties of the blade's localized exterior surface are not critical for the structural integrity of the entire blade. Cosmetic repair or fabrication is often achieved by using oxidation resistant weld or braze alloys of lower strength than the blade body superalloy substrate, but having higher ductility and employing a lower application temperature that does not degrade the structural or material properties of the superalloy substrate.

Diffusion brazing has been utilized to join superalloy components for repair or fabrication by interposing brazing alloy between their abutting surfaces to be joined, and heating those components in a furnace (often isolated from ambient air under vacuum or within an inert atmosphere) until the brazing alloy liquefies and diffuses within the substrates of the to-be-conjoined components. Diffusion brazing can also be used to fill surface defects, such as localized surface and/or non-structural cracks, in superalloy components by inserting brazing alloy into the defect and heating the component in a furnace to liquefy the brazing alloy and thus fill the crack. In some types of repairs a torch rather than a furnace can be used as a localized heat source to melt the brazing alloy. Braze repaired superalloy blades and vanes are typically returned to service.

In a subsequent gas turbine inspection cycle, blades or vanes that are identified as having defects in previously braze-repaired surfaces risk remelt and migration of old braze material if the component were again heated for repairs. Often for commercial cost saving reasons blades with defects in previously brazed portions are scrapped rather than risk potential repair failure attributable to remelt migration of old braze material.

Braze material with the commercial designation Mar-M-509® (A registered trademark of Martin Marietta Co. and commercially available, for example, from Praxair Surface Technologies, Inc. Indianapolis, Ind. under their designations CO-222, CO-333) is a high chrome content superalloy braze material that has commonly been used for repair of CM247 alloy turbine blade and vane components. Products with similar performance characteristics are also commercially available from Sulzer Metco as Amdry MM509 and Amdry MM509B. However, it would be desirable to utilize a braze material including CM247, so that the braze material and the component substrate have more closely matched material properties. A commercial designation for CM247 is MAR-M-247, one form of which is available from Praxair Surface Technologies under their designation NI-335-5.

Thus, a need exists in the art for a braze composition having material properties more closely matching those of CM247 superalloy components, such as gas turbine blades and vanes, that can be rewelded without melt migration from the weld zone and that resists solidification cracking at the weld interface or surrounding areas.

SUMMARY OF THE INVENTION

Some embodiments of the present invention relate to braze alloy compositions comprising a range of approximately 60%-70% by weight of CM247 base alloy and the balance of MarM509A/MarM509B braze alloy. When applied to a CM247 alloy substrate component by diffusion brazing, such compositions do not significantly demelt and migrate when rewelded in a subsequent weld repair. Even after performing a post weld solution cycle the braze material resists solidification cracks at the weld interface and surrounding areas.

It is also demonstrated herein that different braze processing can improve the performance of MarM509A/MarM509B braze alloy mixtures over that typically experienced in prior art brazing using these materials.

Thus, the present invention includes compositions of matter and braze processes suitable for improved brazing of superalloy components wherein, pursuant to some embodiments of the invention, the brazed regions are capable of post braze welding repair without substantial solidification carcking, and also includes superalloy components so brazed and subsequently repaired by welding.

The features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 1: Tabular enumeration of some braze tests performed pursuant to some embodiments of the present invention;

FIG. 2: Typical vacuum cleaning furnace cycle pursuant to some embodiments of the present invention;

FIG. 5: Braze cycle used for some of the braze tests conducted herein, representing a typical braze cycle with multiple stop points in the ramp up to braze temperature, a short dwell at braze temperature and then a drop in temperature, and hold for alloy diffusion;

FIG. 6: Photomicrograph after completion of braze furnace cycle for the 50/50 alloy mix MarM509A/B;

FIG. 7: Photomicrograph after completion of braze furnace cycle for the 60/40 alloy mix MarM509A/B;

FIG. 8: Photomicrograph after completion of braze furnace cycle for the 70/30 alloy mix MarM509A/B;

FIG. 9: Photomicrograph at 50× after completion of braze furnace cycle for the 50/50 alloy mix MarM509A/B (etched);

FIG. 10: Photomicrograph at 50× after completion of braze furnace cycle for the 60/40 alloy mix MarM509A/B;

FIG. 13: Tabular enumeration of some braze tests performed pursuant to some embodiments of the present invention;

FIG. 14: Photomicrograph of cracks created in samples for braze test;

FIG. 15: Photomicrograph of cracks created in samples for braze test prior to HF cleaning;

FIG. 16: Photomicrograph of cracks created in samples for braze test following FIC cleaning and brazing;

FIG. 17: Alloy Application. Photomicrograph of typical cracks created for braze tests following the introduction of paste into the cracks by regulated compressed air behind a piston forcing the paste through an application needle, which was used to work the paste into the cracks as required. The paste comprises a liquid binder mixed with a braze alloy;

FIG. 18: Typical braze cycle as employed for some embodiments herein;

FIG. 33: Results of mechanical testing for various braze materials and mixtures.

DETAILED DESCRIPTION

Figure 3:
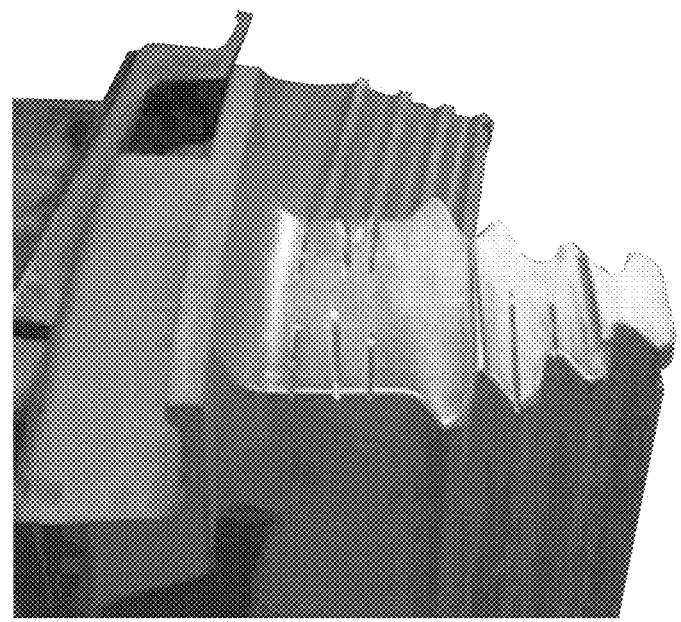
FIG. 3: Photomicrograph of typical cracks created for braze tests.

Improved high temperature repair braze compositions and methods are described, some embodiments of which achieve compositions, mechanical and structural properties nearer to that of the base metal. In some embodiments, the brazed region is subsequently weldable without incurring serious degradation of properties. After considering the following detailed description, those skilled in the art will clearly realize that the teachings of the present invention can be readily utilized in a multi-component braze filler alloy comprising various compositions of CM247 alloy, MarM509A, MarM509B and BRB braze alloy that are suitable for diffusion brazing to a nickel-based superalloy substrate such as CM247, such as typically used in a gas turbine blade or vane. The substrate/braze interface pursuant to some embodiments of the present invention is shown to be amenable to subsequent welding repair without incurring damaging demelting and/or migration of the braze alloy from the interface region. The weld zone and surrounding area are resistant to solidification cracking After the alloy composition is brazed to the base substrate the component may be returned to service. Thereafter, the component remains repairable by welding, if needed to correct future in-service defects, rather than scraping the component, with the weld-repaired component having reduced risk of solidification cracking as a consequence of the welding operation. This represents an important improvement over conventional brazing compositions and methods in which post braze welding typically degrades structural properties to such an extent that the component is no longer suitable for normal use.

CM247

Alloy 247 is an exemplary material for the fabrication of gas turbine components, and thus, to be concrete in our descriptions, specific formulations and procedures for the repair of alloy 247 components are described herein. However, the compositions and procedures described herein are not inherently limited to alloy 247, but can be advantageously used for the repair of other superalloys as apparent to those having ordinary skills in the art of superalloy material science and superalloy component repair.

The following composition has been found to be among those advantageous as a braze filler alloy for use with alloy 247, and comprises approximately 60%-70% by weight CM247 alloy with the remainder being BRB braze alloy. All percents are weight percents and are intended to be approximate, in which slight deviations about the quoted values are not expected to cause dramatic changes in performance or properties. A more precise range of applicability can readily be determined by routine experimentation.

CM 247 has a typical composition as follows (from Huang and Koo, Mat. Transactions, 45, 562-568 (2004), the entire contents of which is incorporated herein by reference for all purposes.):

$Ni(X_{Ni})$—$C(X_C)$—$Cr(X_{Cr})$—$Co(X_{Co})$—$Al(X_{Al})$—$B(X_B)$—$W(X_W)$—$Mo(X_{Mo})$—$Ta(X_{Ta})$—$Ti(X_{Ti})$—$Hf(X_{Hf})$—$ZR(X_{Zr})$.

in which the weight percentages $X_z$ are approximately as follows for CM247 alloy in Eq. 1.

C: $X_C$=0.07%

Cr: $X_{Cr}$=8.1%

Co: $X_{Co}$=9.2%

Al: $X_{Al}$=5.6%

B: $X_B$=0.015%

W: $X_W$=9.5%

Mo: $X_{Mo}$=0.5%

Ta: $X_{Ta}$=3.2%

Ti: $X_{Ti}$=0.7%

Hf: $X_{Hf}$=1.4%

Zr: $X_{Zr}$=0.015%

Ni: $X_{Ni}$=(balance)  Eq. 1.

Slight variations in these proportions are within normal commercial usage. For example, the commercial CM247 known as MAR-M-247 has the composition given in Eq. 2 as provided by the vendor.

C: $X_C$=0.15%

Cr: $X_{Cr}$=8.4%

Co: $X_{Co}$=10.0%

Al: $X_{Al}$=5.5%

B: $X_B$=0.015%

W: $X_W$=10.0%

Mo: $X_{Mo}$=0.7%

Ta: $X_{Ta}$=3.0%

Ti: $X_{Ti}$=1.0%

Hf: $X_{Hf}$=1.5%

Zr: $X_{Zr}$=0.05%

Ni: $X_{Ni}$=(balance)  Eq. 2.

Thus, in view of this data, we use CM 247 herein to denote a superalloy having a composition in approximately the following ranges as given in Eq. 3.

CM 247

C: $X_C$=0.07-0.15%

Cr: $X_{Cr}$=8.1-8.4%

Co: $X_{Co}$=9.2-10.0%

Al: $X_{Al}$=5.5-5.6%

B: $X_B$=0.015%

W: $X_W$=9.5-10.0%

Mo: $X_{Mo}$=0.5-0.7%

Ta: $X_{Ta}$=3.0-3.2%

Ti: $X_{Ti}$=0.7-1.0%

Hf: $X_{Hf}$=1.4-1.5%

Zr: $X_{Zr}$=0.015-0.05%

Ni: $X_{Ni}$=(balance)  Eq. 3.

The results reported herein employ AIMRO CM 247, substantially the same as CM247 described herein. For economy of language, we use "CM247" herein to denote a material having a composition substantially within the ranges given by Eq. 3.

The experimental data obtained herein relates to directionally solidified CM 247 (CM247DS). However, it is not expected that the use of single crystal, polycrystalline or other forms of CM 247 will have a significant effect on the results.

BRB

BRB is a nickel-based diffusion braze alloy, such as commercially available through Sulzer Metco as Amdry BRB. The BRB material used herein has substantially the following composition: $Ni(X_{Ni})$—$Cr(X_{Cr})$—$Co(X_{Co})$—Al $(X_{Al})$—$B(X_B)$ in which the weight percentages $X_z$ are approximately in the following ranges:

BRB

Cr: $X_{Cr}$=13.0-14.0%

Co: $X_{Co}$=9.0-10.0%

Al: $X_{Al}$=3.5-4.5%

B: $X_B$=2.25-2.75%

Ni: $X_{Ni}$=(balance)                                    Eq. 4.

with a particle size distribution having a nominal range −150+45 μm (micrometers), mesh (ASTM) −100+325 mesh. For economy of language, we use "BRB" herein to denote a material having a composition substantially within the ranges given by Eq. 4.

MarM509A/MarM509B

Brazing tests and improved brazing results are also described herein for cobalt based superalloys containing relatively large amounts of chromium and nickel commercially known under the trade names MarM509 (MarM509A, or briefly "509A"), MarM509B ("509B"). The particular MarM509A/B materials used herein were obtained from Sulzer Metco under the trade names Amdry MM509 (509A) and Amdry MM509B (509B). The compositions provided by the vendor are as follows:

| 509A (Eq. 5A) |
|---|
| C: $X_C$ = 0.6% |
| Cr: $X_{Cr}$ = 24% |
| Ni: $X_{Ni}$ = 10% |
| W: $X_W$ = 7% |
| Ta: $X_{Ta}$ = 3.5% |
| Co: $X_{Co}$ = (balance) |
| 509B (Eq. 5B) |
| C: $X_C$ = 0.6% |
| Cr: $X_{Cr}$ = 23% |
| Ni: $X_{Ni}$ = 10% |
| W: $X_W$ = 7% |
| Ta: $X_{Ta}$ = 3.5% |
| B: $X_B$ = 2.5% |
| Co: $X_{Co}$ = (balance) |

Studies were carried out using several of the present braze composition alloys pursuant to some embodiments of the present invention to repair cracks on an alloy 247 blade substrates and subsequently weld the brazed blades with the results described herein. It is apparent that these results demonstrate an improvement over prior art brazing compositions and methods, leading towards more effective, less expensive, service-ready repairs of superalloy components following brazing.

Results: CM247 DS Base Material Braze with CM247/BRB and MarM509A/MarM509B.

Improvements obtainable pursuant to some embodiments of the present invention, employing different mixtures of CM247/BRB and MarM509A/MarM509B under different processing conditions are presented. To be concrete in our discussion, we consider brazing a CM247 substrate material, more particularly, a component comprising service run row 1 turbine blades from the W501G engine made of CM247 DS castings. These examples are intended to be illustrative, not limiting, as one skilled in the art can readily adapt these compositions and methods to other substrate materials and/or components without undue experimentation. That is, these tests are typical examples of results obtainable and do not limit the scope of the present invention to specific compositions or process conditions disclosed. However, this particular example of turbine blades has considerable practical and commercial importance in itself.

The tests described herein were conducted in separate rounds consisting of different braze base alloys of multiple mixtures with one braze alloy, different braze furnace cycles and different substrate preparation methods.

Several criteria were used to evaluate the results of these tests:
1. General visual appearance of the braze.
2. Metallographic evaluation of the interface, crack fill and porosity.
3. Remelt of the braze during a post braze solution heat treat cycle.
4. Post braze weldability.
5. Mechanical testing including surface hardness, UTS (ultimate tensile strength), yield and elongation.

Examples A: MarM509A/MarM509B ("MarM509A/B") Mixtures

"MarM509A/B" denotes a mixture of 509A and 509B materials having the compositions substantially as given in Eqs. 5A and 5B respectively.

Example A.I: Surface Preparation

Two methods of surface preparation were combined for this test. A mechanical cleaning of the area was performed, using carbide blend tools to create a simulated crack approximately 0.050" (inches) in width by approximately 0.050" in depth. A typical example is shown in FIG. 3. Following the mechanical cleaning and the creation of the simulated cracks, the blade material was subjected to a vacuum cleaning furnace cycle according to the procedures given in FIG. 2.

Example A.II: Alloy Application

Figure 4:
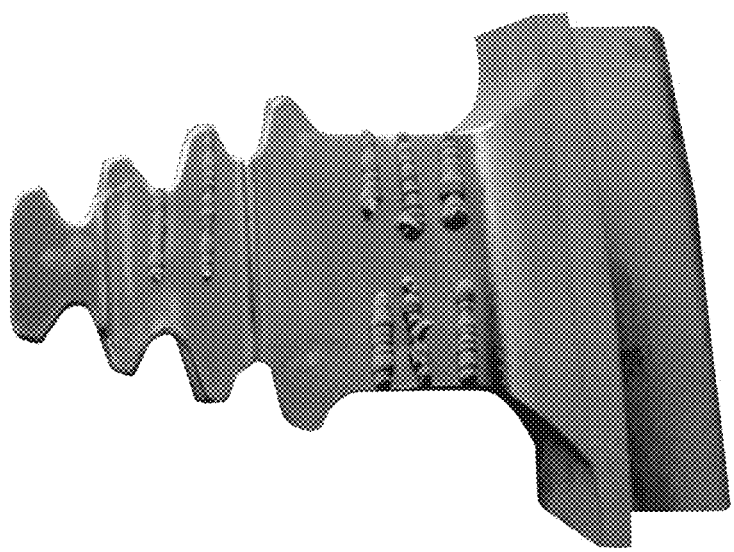
FIG. 4: Photomicrograph of typical cracks created for braze tests following the introduction of paste into the cracks by regulated compressed air behind a piston forcing the paste through an application needle, which was used to work the paste into the cracks as required. The paste comprises a liquid binder mixed with a braze alloy.

Three different mixtures of a single base and a single braze alloy were tested. In all of these cases, the braze alloy was MarM509B ("509B") and the base was MarM509A ("509A"). The base was mixed with braze alloy with weight ratios 509A/509B of 50/50, 60/40, 70/30 and then combined with liquid binder in the amount of about 10%-15% by volume to form a paste. The paste was then worked into a plastic cartridge with regulated compressed air behind a piston to force the paste through an application needle that was used to work the paste into the cracks as required. Stop off can be applied as required to the base material around the braze to assure that the alloy does not run outside the intended repair zone. A typical result of this alloy-application, crack-filling step is shown in FIG. 4.

Example A-III: Braze Cycle

The braze cycle employed in this Example A represents a typical braze cycle with multiple stop points in the ramp up to braze temperature, a dwell at braze temperature followed by a drop in temperature and a holding period for alloy diffusion. A typical cycle is given in FIG. 5. It is important to note that 2200 deg. F is the highest temperature applied during all braze cycles employed in these Examples-A for MarM509A/B.

Example A-IV: Results

Results from seven tests are reported herein, identified as Example A-04 to Example A-10 in FIG. 1.

A-IV(i): Post Braze Visual Evaluation.

A visual inspection was performed after the braze furnace cycle was completed. The results for MarM509A/B (Examples A-04, A-05, A-06 of FIG. 1) are shown as follows:

FIG. 6 is a photomicrograph of results obtained with the 50/50 alloy mixture. This 50/50 alloy mixture appears hot (that is, close to or exceeding its melting point) and perhaps has a slight undercut around the braze edges, although this cannot be definitively determined from this micrograph.

FIG. 7 is a photomicrograph of results obtained with the 60/40 alloy mixture. This 60/40 alloy mixture appears to have a reasonably smooth appearance and apparently shows continuous flow at the edges.

FIG. 8 is a photomicrograph of results obtained with the 70/30 alloy mixture. This 70/30 alloy mixture apparently shows a sluggish flow resulting in a significant transition at the braze edges.

A-IV(ii): Metallographic Evaluation

Metallographic evaluation was performed at 50× for flow, interface quality, porosity and other defects. The results for MarM509A/B (Examples A-04, A-05, A-06 of FIG. 1) are shown as follows:

FIG. 9 is the metallographic result for the 50/50 braze mixture. This photomicrograph apparently indicates good flow into the base material, providing a smooth transition from the braze repair area. The interface appears to be substantially acceptable but with a hint of being hot. Porosity was below 1% of the measured area of the repair.

FIG. 10 is the metallographic result for the 60/40 braze mixture. This photomicrograph apparently indicates good flow into the base material, providing a smooth transition from the braze repair area. The interface appears to be excellent and porosity was below 1% of the measured area of the repair.

Figure 11:
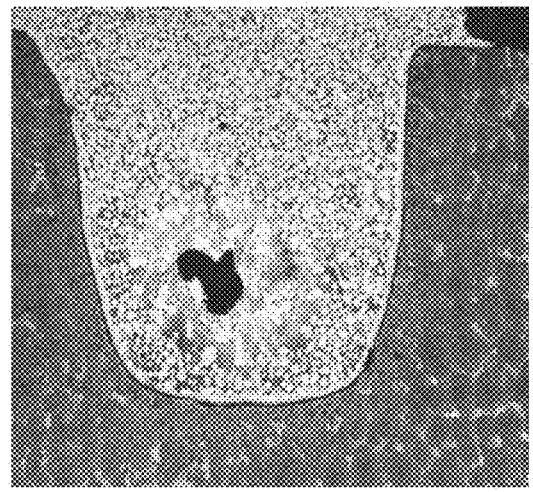
FIG. 11: Photomicrograph at 50× after completion of braze furnace cycle for the 70/30 alloy mix MarM509A/B (etched)

FIG. 11 is the metallographic result for the 70/30 braze mixture. This photomicrograph apparently indicates sluggish flow into the base material with a sharp contrast from the blaze alloy. The interface appears to be substantially acceptable but the porosity was rather high with severe voiding arising from a lack of adequate alloy flow.

A-IV(iii): Remelt Evaluation

Figure 12:
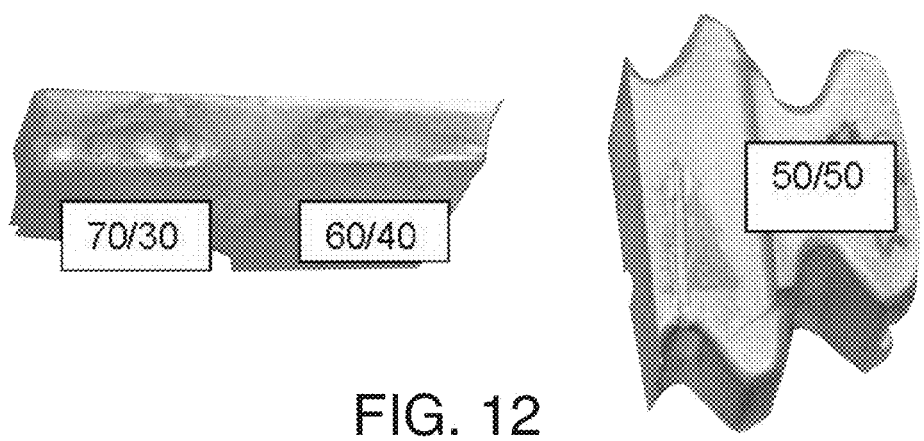
FIG. 12: Remelt Evaluation. Photomicrograph following a solution heat treat cycle after completion of the braze furnace cycle to evaluate the affect on the braze of possible normal repair processes following brazing. Three mixtures of MarM/A/B are depicted (left to right), 70/30, 60/40, 50/50.

The three different mixtures considered in this Example-A, MarM509A/B (Examples-04, -05, -06 of FIG. 1) were subjected to a typical solution heat treat cycle after the braze was completed in order to determine if the braze alloy would likely be affected if the component so brazed were later subjected to a normal repair process. The remelt percentage was calculated by comparing the alloy height following solution heat treatment to the alloy height following the braze process but before the solution heat treatment. For 50/50 (MarM509A/B) more than 100% remelt was observed. The alloy returned to its liquid state and ran off the workpiece resulting in a depression below the level of the original surface. For 60/40 (MarM509A/B), approximately 50% alloy height loss was observed. For 70/30 (MarM509A/B), approximately 30% alloy height loss was observed. A photomicrograph of these results is provided in FIG. 12.

A-IV(iv): Post Braze Weld Evaluation

No weld evaluation was performed on these braze samples due to the failure of the remelt tests.

A-IV(v): Mechanical Testing

No mechanical testing was performed on these samples due to the failure of the remelt tests.

Example B: CM247/BRB Mixtures

"CM247/BRB" denotes a mixture of CM247 and BRB materials having the compositions substantially as given in Eqs. 3 and 4 respectively.

Additional braze tests were performed combining braze and diffusion cycles performed to the same times and temperature as used for the base material heat treat cycle. The tests consisted of one braze cycle, one surface preparation method, with two base alloys mixed using three different levels of two different braze alloys.

Example B-I: Surface Preparation

The braze surfaces were prepared using a mechanical cleaning method with carbide blend tools to create a simulated crack approximately 0.050" in width by approximately 0.050" in depth. No vacuum cleaning furnace cycle was performed after the mechanical cleaning operation. One blade was cleaned using a fluoride ion cleaning (FIC) furnace with HF gas to prepare the surface for braze. FIGS. 14, 15, 16 show typical blades at various stages in the surface preparation process.

Example B-II: Alloy Application

Three different mixtures of two base and braze alloys were prepared and tested: (MarM-509A base/MarM-509B braze) and (CM247/BRB).

The MarM-509A ("509A") base was mixed with MarM-509B ("509B") braze alloy in the ratios (by weight) 60/40, 70/30, 80/20 (509A/509B). These mixtures were then combined with liquid binder in an amount of 10%-15% by volume to form a paste. The CM247 base was mixed with BRB braze alloy in the ratios CM247/BRB (by weight) 60/40, 70/30, 80/20. These mixtures were then combined with liquid binder in an amount of 10%-15% by volume to form a paste. Thus, six pastes were prepared and tested.

Each paste was worked into a plastic cartridge with regulated compressed air behind a piston to force the paste through an application needle that was used to work the paste into the cracks as required. Stop off can be applied as required to the base material around the braze to assure that the alloy does not run outside the intended repair zone. FIG. 17 shows typical blades following the step of alloy application.

Example B-III: Braze Cycle

The braze cycle used was chosen to have the same times and temperatures as a standard solution heat treat cycle, as given in FIG. 18.

Example B-IV: Results

Results from 20 tests are reported herein, identified as Example B-14 to Example B-39 in FIG. 13.

B-IV(i): Post Braze Visual Evaluation

Figure 19:
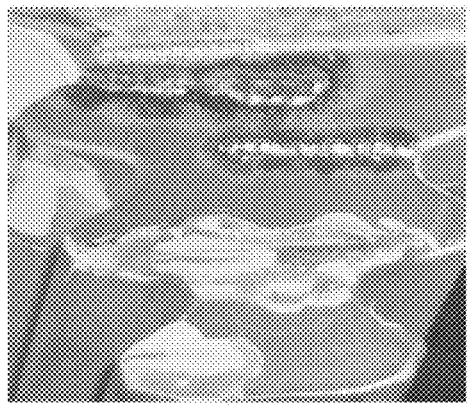
FIG. 19: Photomicrograph after completion of braze furnace cycle for the 60/40 alloy mix MarM509A/B.

A visual inspection was performed following the combined braze and diffusion furnace cycle of FIG. 18. The results for MarM509A/B (Examples B-29, B-30, B-31) are shown as follows:

FIG. 19 is a photomicrograph of results obtained with the 60/40 alloy mixture. This mixture appears hot with excessive run of the alloy from the braze area.

Figure 20:
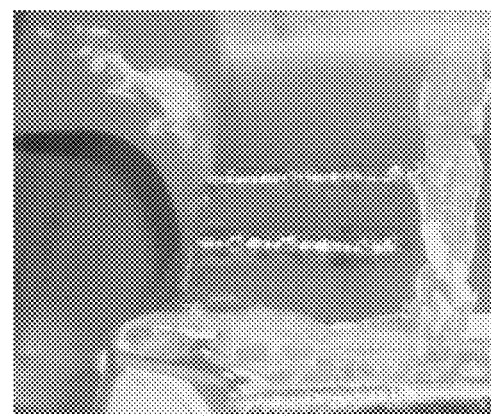
FIG. 20: Photomicrograph after completion of braze furnace cycle for the 70/30 alloy mix MarM509A/B.

FIG. 20 is a photomicrograph of results obtained with the 70/30 alloy mixture. This mixture has an excellent smooth appearance with good continuous flow at the edges.

Figure 21:
FIG. 21: Photomicrograph after completion of braze furnace cycle for the 80/20 alloy mix MarM509A/B.

FIG. 21 is a photomicrograph of results obtained with the 80/20 alloy mixture. This mixture has a slight sluggish appearance but appears to be acceptable with some contrast at the braze edges.

Figure 22:
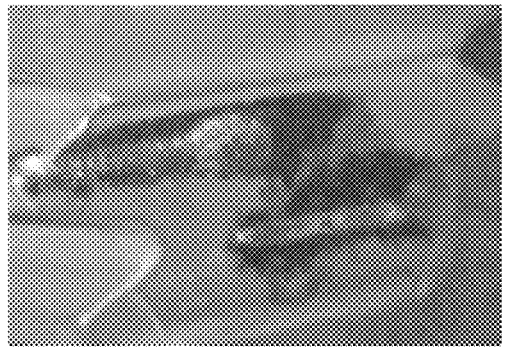
FIG. 22: Photomicrograph after completion of braze furnace cycle for the 60/40 alloy mix CM247/BRB.

The results of the visual inspection for CM247/BRB (Examples B-14, B-15, B-16) are shown as follows:

FIG. 22 is a photomicrograph of results obtained with the 60/40 alloy mixture. This mixture appears very hot with excessive run of the alloy from the braze area.

Figure 23:
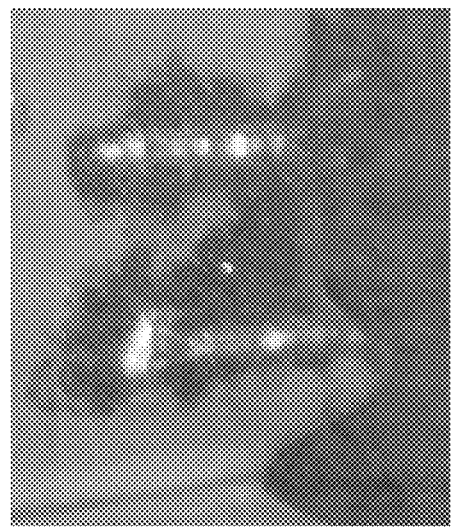
FIG. 23: Photomicrograph after completion of braze furnace cycle for the 70/30 alloy mix CM247/BRB.

FIG. 23 is a photomicrograph of results obtained with the 70/30 alloy mixture. This mixture has a good smooth appearance at the edges with some alloy flow from the repair area.

Figure 24:
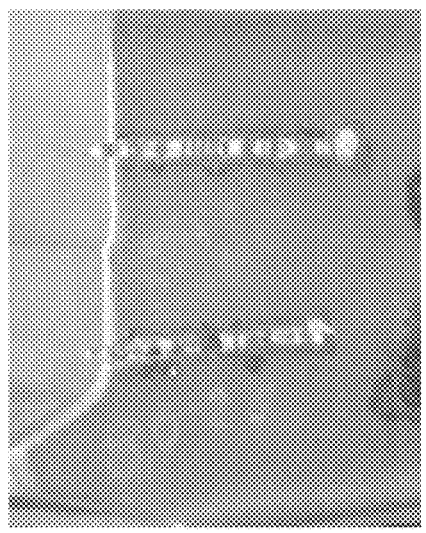
FIG. 24: Photomicrograph after completion of braze furnace cycle for the 80/20 alloy mix CM247/BRB.

FIG. 24 is a photomicrograph of results obtained with the 80/20 alloy mixture. This mixture has a smooth appearance at the braze edges with a slight sluggish appearance, but probably an acceptable appearance.

B-IV(ii): Metallographic Evaluation

Figure 25:
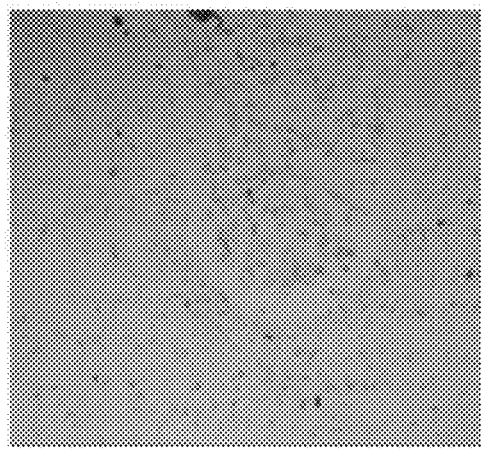
FIG. 25: Photomicrograph at 50× after completion of braze furnace cycle for the 60/40 alloy mix MarM509A/B.

Metallographic evaluation was performed at 50× for flow, interface quality, porosity and other defects. The results for MarM509A/B (Examples B-29, B-30, B-31) are shown as follows:

FIG. 25 is a photomicrograph of results obtained with the 60/40 braze mixture. The photomicrograph apparently shows good flow into the base material providing a smooth transition from the braze alloy. The interface appears to be acceptable but with a hint of being hot. Porosity was similar to the casting material and below about 1% of the measured volume of the repair area.

Figure 26:
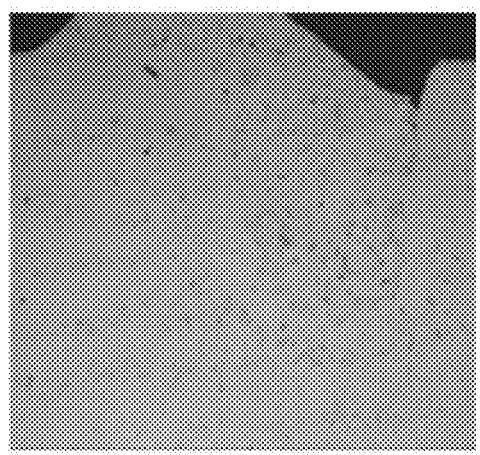
FIG. 26: Photomicrograph at 50× after completion of braze furnace cycle for the 70/30 alloy mix MarM509A/B.

FIG. 26 is a photomicrograph of results obtained with the 70/30 braze mixture. The photomicrograph shows excellent flow into the base material, providing a smooth transition from the edges. The interface is excellent. The porosity is similar to the casting material and below about 1% of the measured volume of the repaired area. The right edge of the braze was apparently missed and not filled during the application of the alloy.

Figure 27:
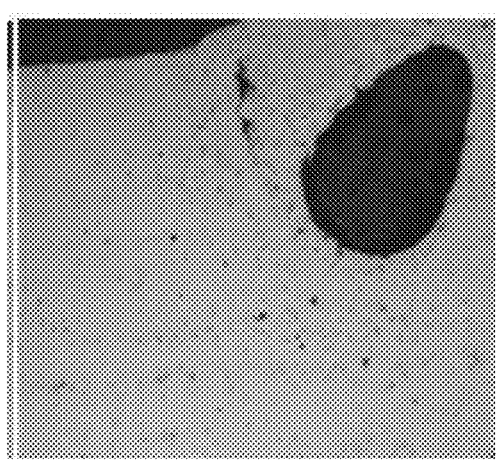
FIG. 27: Photomicrograph at 50× after completion of braze furnace cycle for the 80/20 alloy mix MarM509A/B.

FIG. 27 is a photomicrograph of results obtained with the 80/20 braze alloy mixture. The photomicrograph shows sluggish flow into the base material with a sharp contrast from the regions at the edges. The actual interface is apparently acceptable but the porosity was beyond typically acceptable limits with severe voiding from lack of flow.

Figure 28:
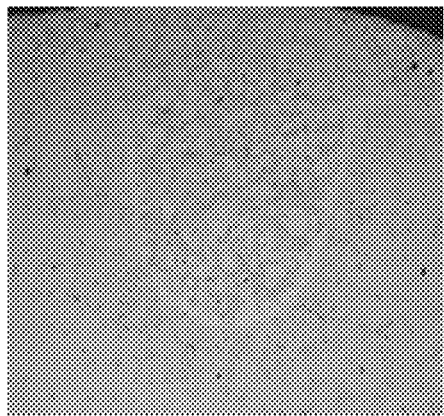
FIG. 28: Photomicrograph at 50× after completion of braze furnace cycle for the 60/40 alloy mix CM247/BRB.

The results for CM247/BRB (Examples B-14, B-15, B-16) are shown as follows:

FIG. 28 is a photomicrograph of results obtained with the 60/40 braze mixture. The photomicrograph apparently shows good flow into the base material providing a smooth transition from the braze repair area. The interface appears to be acceptable but with a hint of being hot. Porosity was similar to the casting material and below about 1% of the measured volume of the repair area.

Figure 29:
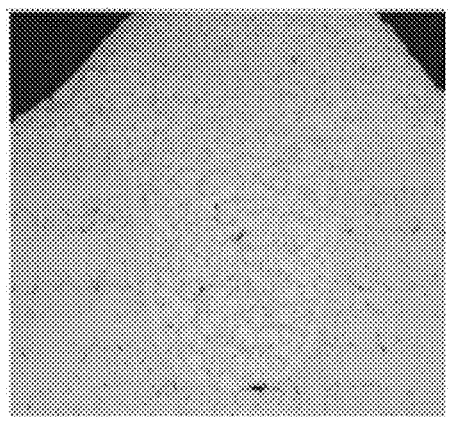
FIG. 29: Photomicrograph at 50× after completion of braze furnace cycle for the 70/30 alloy mix CM247/BRB.

FIG. 29 is a photomicrograph of results obtained with the 70/30 braze mixture. The photomicrograph shows excellent flow into the base material, providing a smooth transition from the braze repair area. The interface is excellent. The porosity is similar to the casting material and below about 1% of the measured volume of the repair area.

Figure 30:
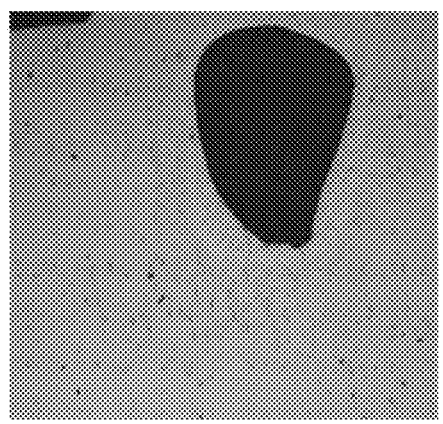
FIG. 30: Photomicrograph at 50× after completion of braze furnace cycle for the 80/20 alloy mix CM247/BRB.

FIG. 30 is a photomicrograph of results obtained with the 80/20 braze alloy mixture. The photomicrograph shows sluggish flow into the base material with a sharp contrast at the edges. The actual interface is apparently acceptable but the porosity was beyond typically acceptable limits with severe voiding from lack of flow.

Example B-IV(iii): Remelt Evaluation

Three different mixtures of MarM509/A/B were subjected to a solution heat treat cycle (2270 deg. F) after the initial braze was completed to determine if the braze would be affected during a future normal repair process. The remelt percentage was calculated by comparing the bead height following the solution heat treat cycle with the post braze alloy bead height.

60/40 Remelt Evaluation: 100% of the alloy height loss was observed (Total Remelt).

70/30 Remelt Evaluation: An alloy height loss of approximately 10% of was observed.

80/20 Remelt Evaluation: No alloy height loss was observed.

It is important to note that this remelt evaluation shows marked improvement over the remelt discussed in Example A-IV(iii) for the 70/30 and 80/20 compositions. We attribute this to the use of generally higher braze temperature and times for these Examples-B in comparison to the braze temperature and times used in Example-A. From FIG. 18 we see that Example-B components were held at 2270 deg. F (±12 deg. F) for 240-255 min. while in Example-A, the components were held at 2200 deg. F (±10 deg. F) for 40 min. and at 2050 deg. F (±10 deg. F) for 270 min. (FIG. 5). Thus, we conclude that the different time-temperature protocol has an important effect on the properties of braze joints for 509A/509B braze compositions and that ratios of 509A/509B less than about 70/30 are contraindicated.

Three different mixtures of CM247/BRB were subjected to a solution heat treat cycle (2270 deg. F) after the initial braze was completed to determine if the braze would be affected during a future normal repair process. The remelt percentage was calculated by comparing the bead height following the solution heat treat cycle with the post braze alloy bead height.

60/40 Remelt Evaluation: 100% of the alloy height loss was observed (Total Remelt).

70/30 Remelt Evaluation: An alloy height loss of approximately 10% of was observed.

80/20 Remelt Evaluation: No alloy height loss was observed.

In summary, 60/40 shows good flowability, deposition and mechanical properties, but lacks good remelt characteristics when compared to 70/30 or 80/20. It appears advantageous to use the 70/30 mixture if the braze composition is to be applied and if it is to be subjected to any re-heating above about 2270 deg.

Example B-IV(iv): Post Braze Weld Evaluation

Figure 31:
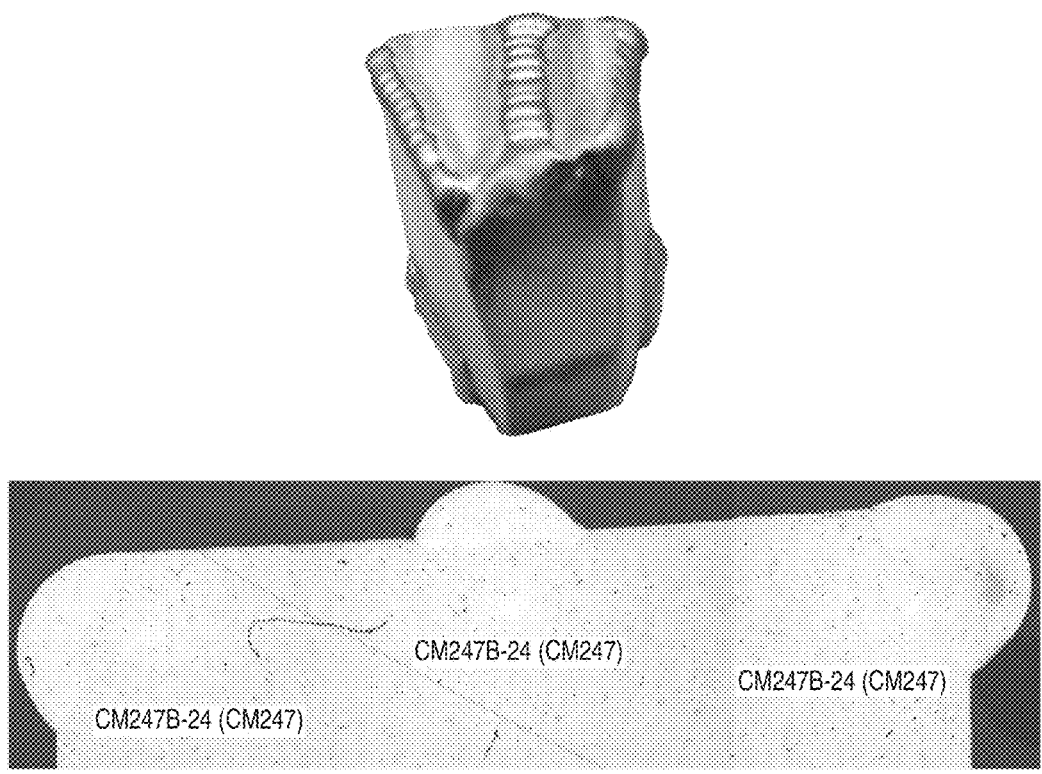
FIG. 31: Perspective and cross sectional photomicrograph following a solution heat treat cycle (2250 deg. F) after completion of the braze furnace cycle to evaluate the affect on the braze of possible normal repair processes following brazing of CM247/BRB on a CM247 substrate with IN625 filler material.

An evaluation was done on CM247/BRB (Example B-24) to observe the effect of a post braze weld repair using IN625 filler material. The test was completed after a post weld solution cycle. However, no age heat treat was performed. No cracks were observed at the interface or surrounding areas, and the welder performing the work reported that this weld seemed to be similar to that of a weld of the base alloy. See FIG. 31.

Figure 32:
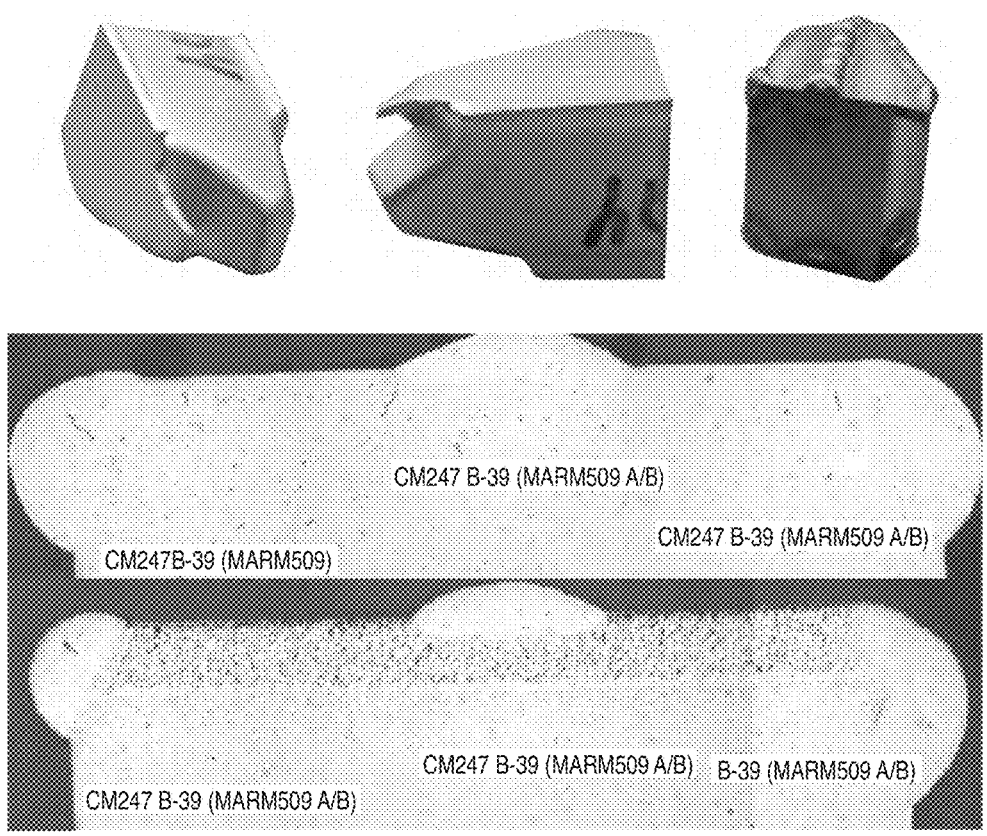
FIG. 32: Photomicrograph following a solution heat treat cycle (2250 deg. F) after completion of the braze furnace cycle to evaluate the affect on the braze of possible normal repair processes following brazing of MarM509/A/B on a CM247 substrate with IN625 filler material. In the drawings and in the specification, "MarM509 or "509" is an abbreviation of MarM509A or 509A respectively.

An evaluation was done on MarM509/A/B (Example B-39) to observe the effect of a post braze weld repair using IN625 filler material. The test was completed after a post weld solution cycle. However, no age heat treat was performed. No cracks were observed at the interface or surrounding areas, and the welder performing the work reported that this weld seemed to be similar to that of a weld of the base alloy. See FIG. 32. Therefore, the 70/30 mixture is considered to be advantageous on the basis of the following tests and/or observations:

Flowability (ability to fill the gaps and cracks)
Remelt
Reweld
Hardness

Tensile Tests
Mechanical Tests

Example B-IV(vi): Mechanical Testing

Mechanical testing was done to compare the hardness, tensile strength, yield and elongation of the two alloys of various mixtures against the base material and the base material with IN625 weld repairs. The tests were carried out by Metcut Research, Inc. of Cincinnati, Ohio according to the procedures given in FIG. 33. Six samples of each type were tested and the average of those six are reported in FIG. 33 including the Base Material (Specimen 45) and the base material with IN625 weld repairs (Specimen 46).

CONCLUSIONS

Surface Preparation

Mechanical cleaning provided an excellent braze surface and interface between braze and the base alloy. The mechanical-vacuum cleaning process used in Example A provided an equal interface, however no better than the mechanical cleaning process alone. No apparent benefits resulted from using the extra furnace cycle. Examples B were performed after mechanical preparation of the surface using a carbide burr to remove the top layer of material. The mechanical test samples were also prepared using this same method which further indicates the acceptability of the process. The FIC cleaning process did provide a better visual wetting of the alloy and apparently a very slightly improved interface observed during the lab examination. However, all mechanical tests performed showed a consistent loss of tensile strength of about 4%-5%.

Braze Alloy Selection and Application.

The CM247 base alloy mixed with BRB braze material consistently provided the best test results observed herein. The CM247 and MarM509A base alloy powders provided substantially equal results with regard to visual flow and interface quality. However, when mixed with equal amounts of braze alloy the CM247 typically was slightly more free flowing. The CM247 alloy typically provided 13%-15% better tensile strength values than the MarM509 alloy of the same mixture with higher and more consistent strain rate through 2.0% yield values. Both CM247 and MarM509 braze provided substantially equal visual results when welded with IN625 filler material. However, it is generally better practice to strive to have the chemical composition of the repair area as close to the original base material as possible (that is, a higher base alloy content in the mixtures).

The 70/30 mixture of the CM247 base powder with the BRB braze alloy provided better results with regard to porosity, crack fill, post braze solution cycle remelt and tensile strength. It is also observed that the braze elongation with the CM247 base alloy was typically superior to the MarM509 alloy. However the elongation numbers typically decreased from the 60/40 mixture up to the 70/30 mixture.

The remelt evaluation with the 70/30 mixture seemed to be acceptable with regard to future repair cycles with only a slight hint (10% height loss) of the alloy turning liquid during subsequent solution cycles.

Braze Cycle

All braze cycles performed with the lower braze cycle temperature (2200 deg. F) experienced complete remelt test failures even when higher base material alloy was added to the mixture. The higher braze cycle temperature used in the second (B) tests provided improved results in the remelt evaluations.

The advantage to the higher temperature braze cycle, which in effect is equal to the standard solution heat treat cycle of the base material, is that the opportunity to braze before or after weld repairs is always present without the addition of heat treat cycles which add cost to the repair process and may have some unknown effect to the base material properties.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A method for brazing an Ni base superalloy component comprising, in the following order:

placing the Ni base superalloy component to be brazed and the brazing material into a brazing furnace, properly configured to perform the desired brazing process upon heating; and increasing the furnace temperature to within about 25 deg. F of 1800 deg. F at a rate of approximately 28 deg. F per minute; and reducing the pressure within the furnace to less than about 0.005 Torr and hold for stabilization; and increasing the furnace temperature to within about 12 deg. F of 2270 deg. F at a rate no greater than about 10 deg. F per min. and hold at this temperature for about 240 to 255 minutes for combined braze and diffusion cycle time while maintaining the pressure no greater than about 0.005 Torr; and vacuum cooling the furnace temperature to within about 25 deg. F of 1975 deg. F in a time no more than about 3 minutes; and rapid cooling to room temperature by back purging with inert gas; and, wherein the brazing material comprises:

a mixture of no less than approximately 70% by weight of a base alloy comprising, by weight:

C: $X_C$=0.6%;

Cr: $X_{Cr}$=24%;

Ni: $X_{Ni}$=10%;

W: $X_W$=7%;

Ta: $X_{Ta}$=3.5%;

Co: $X_{Co}$=(balance) and the balance comprising a braze alloy comprising:

C: $X_C$=0.6%;

Cr: $X_{Cr}$=23%;

Ni: $X_{Ni}$=10%;

W: $X_W$=7%;

Ta: $X_{Ta}$=3.5%;

B: $X_B$=2.5%;

Co: $X_{Co}$=(balance);

the mixture including about 10%-15% by volume of a liquid binder to form a paste.

2. The method of claim 1, wherein the Ni base superalloy turbine component comprises, by weight:

C: $X_C$=0.07-0.15%;

Cr: $X_{Cr}$=8.1-8.4%;

Co: $X_{Co}$=9.2-10.0%;

Al: $X_{Al}$=5.5-5.6%;

B: $X_B$=0.015%;

W: $X_W$=9.5-10.0%;

Mo: $X_{Mo}$=0.5-0.7%;

Ta: $X_{Ta}$=3.0-3.2%;

Ti: $X_{Ti}$=0.7-1.0%;

Hf: $X_{Hf}$=1.4-1.5%;

Zr: $X_{Zr}$=0.015-0.05%;

Ni: $X_{Ni}$=(balance).

3. The method of claim 1, wherein the Ni base superalloy component is a turbine vane or blade.

4. The method of claim 1, further comprising re repairing the superalloy component by post braze welding and designating the superalloy component as suitable for continued service.

5. The method of claim 4, wherein the Ni base superalloy turbine component comprises, by weight:

C: $X_C$=0.07-0.15%;

Cr: $X_{Cr}$=8.1-8.4%;

Co: $X_{Co}$=9.2-10.0%;

Al: $X_{Al}$=5.5-5.6%;

B: $X_B$=0.015%;

W: $X_W$=9.5-10.0%;

Mo: $X_{Mo}$=0.5-0.7%;

Ta: $X_{Ta}$=3.0-3.2%;

Ti: $X_{Ti}$=0.7-1.0%;

Hf: $X_{Hf}$=1.4-1.5%;

Zr: $X_{Zr}$=0.015-0.05%;

Ni: $X_{Ni}$=(balance).

6. The method of claim 4, wherein the Ni base superalloy component is a turbine vane or blade.

7. The method of claim 1, further comprising post braze heat treatment of the superalloy component and designating the superalloy component as suitable for continued service.

8. The method of claim 7, wherein the Ni base superalloy turbine component comprises, by weight:

C: $X_C$=0.07-0.15%;

Cr: $X_{Cr}$=8.1-8.4%;

Co: $X_{Co}$=9.2-10.0%;

Al: $X_{Al}$=5.5-5.6%;

B: $X_B$=0.015%;

W: $X_W$=9.5-10.0%;

Mo: $X_{Mo}$=0.5-0.7%;

Ta: $X_{Ta}$=3.0-3.2%;

Ti: $X_{Ti}$=0.7-1.0%;

Hf: $X_{Hf}$=1.4-1.5%;

Zr: $X_{Zr}$=0.015-0.05%;

Ni: $X_{Ni}$=(balance).

9. The method of claim 7, wherein the Ni base superalloy component is a turbine vane or blade.

* * * * *